(12) United States Patent
Reuter et al.

(10) Patent No.: US 8,609,398 B1
(45) Date of Patent: Dec. 17, 2013

(54) SELECTIVE BIODEGRADATION OF FREE FATTY ACIDS IN FAT-CONTAINING WASTE

(75) Inventors: Christopher J. Reuter, Parrish, FL (US); Vincent Scuilla, Sarasota, FL (US); Lauren G. Danielson, Palmetto, FL (US); Steven J. MacKenzie, Sarasota, FL (US)

(73) Assignee: Osprey Biotechnics, Inc., Sarasota, FL (US)

( * ) Notice: Subject to any disclaimer, the term of this patent is extended or adjusted under 35 U.S.C. 154(b) by 0 days.

(21) Appl. No.: 13/585,291

(22) Filed: Aug. 14, 2012

(51) Int. Cl.
*C02F 3/34* (2006.01)

(52) U.S. Cl.
USPC ........................................................... 435/262

(58) Field of Classification Search
None
See application file for complete search history.

(56) References Cited

U.S. PATENT DOCUMENTS

| | | | |
|---|---|---|---|
| 4,452,894 A | 6/1984 | Olsen et al. | |
| 4,593,003 A | 6/1986 | Vandenbergh | |
| 4,800,158 A | 1/1989 | Vandenbergh | |
| 4,810,385 A | 3/1989 | Hater et al. | |
| 4,853,334 A | 8/1989 | Vandenbergh et al. | |
| 4,870,012 A | 9/1989 | Vandenbergh | |
| 4,910,143 A | 3/1990 | Vandenbergh | |
| 5,516,687 A | 5/1996 | Perez et al. | |
| 6,325,934 B1 | 12/2001 | Tobey, Jr. et al. | |
| 6,982,155 B1* | 1/2006 | Fukuda et al. | 435/135 |
| 2004/0232069 A1 | 11/2004 | Shaffer et al. | |
| 2005/0036990 A1 | 2/2005 | Tisinger et al. | |
| 2007/0209988 A1 | 9/2007 | Lemay et al. | |
| 2007/0272603 A1 | 11/2007 | Oya | |
| 2008/0093295 A1 | 4/2008 | Heppenstall et al. | |
| 2009/0301964 A1 | 12/2009 | Oya | |
| 2009/0321350 A1 | 12/2009 | Nelson et al. | |
| 2010/0130763 A1* | 5/2010 | Gao | 554/167 |

OTHER PUBLICATIONS

Van Gerpen J, Shanks, B, and Pruszko R, "Biodiesel Production Technology", National Renewable Energy Laboratory/Subcontractor Report-510-36244, Golden CO, Jul. 2004, pp. 52-54.*
Glycerol. The Merck Index—An Encyclopedia of Chemicals, Drugs, and Biologicals, 14th Ed. O'Neal MJ, et al. Eds.; Merck & Co. Inc.: Whitehouse Station, NJ, 2006, 2012; entry 04484.*
C.T. Hou and T.M. Johnston, Screening of Lipase Activities with Cultures from the Agricultural Research Service Culture Collection, Oil Chemical Research, National Center for Agricultural Utilization Research, Agricultural Research Service, U.S. Department of Agriculture, Peoria, Illinois 61604, JAOCS, vol. 69, No. 11 (Nov. 1992).
Munox® XL-Plus State-of-the-Art Bioaugmentation for Industrial Wastewater Treatment, Product Profile, 1999.
M. Canakci, J. Vangerpen, Biodiesel Production from Oils and Fats with High Free Fatty Acids, 2001 American Society of Agricultural Engineers ISSN 001-2351, vol. 44 (6): 1429-1436.
Biodiesel Production and Quality, Updated Apr. 26, 2007.

* cited by examiner

*Primary Examiner* — Allison Ford
*Assistant Examiner* — Michelle F Paguio Frising
(74) *Attorney, Agent, or Firm* — Butzel Long

(57) ABSTRACT

A process of selectively degrading fatty acids in fat-containing waste materials without significant degradation of triglycerides, thereby converting otherwise economically burdensome waste materials into valuable products, involves contacting a fat-containing waste comprising triglycerides and fatty acids with a bacterial culture comprising *Pseudomonas* bacteria capable of degrading fatty acids into water and carbon dioxide, and wherein the bacterial culture is substantially free of microorganisms capable of producing extracellular lipase in an amount that would cause significant degradation of the triglycerides.

9 Claims, 1 Drawing Sheet

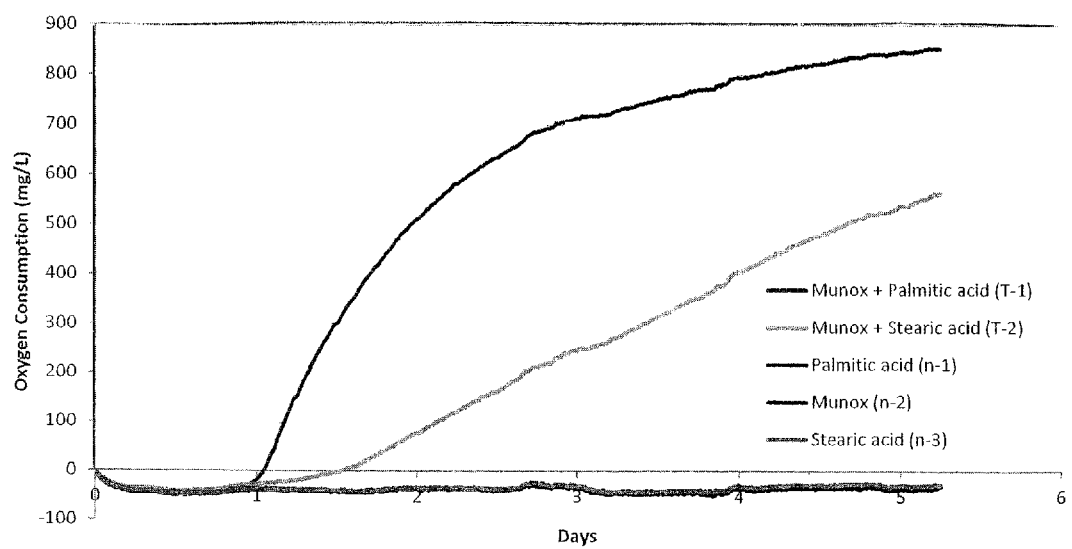

SELECTIVE BIODEGRADATION OF FREE FATTY ACIDS IN FAT-CONTAINING WASTE

CROSS-REFERENCE TO RELATED APPLICATIONS

Not Applicable.

FIELD OF THE DISCLOSURE

Disclosed is a process for selectively decomposing undesirable components in waste fats to allow reclamation of desirable components such as for further processing into fuels or other useful products.

BACKGROUND OF THE DISCLOSURE

Wastewater is a by-product of residential, commercial, agricultural, or industrial waste production such as that from homes, farms, and manufacturing plants, among others. Every day there are an estimated 40 billion gallons of wastewater created in POTWs (Publically Owned Treatment Works) alone (Center for Sustainable Systems, University of Michigan, 2010). The accumulation of debris in WWTPs (Wastewater Treatment Plants) and other wastewater processing equipment (such as drainlines, septic systems, sewers, grease traps, lift-stations, holding tanks and ponds) presents a major problem not only to the limitation of water re-use but also as a major cause of costly equipment failure throughout the processing of the wastewater. FOG (Fats, Oils, and Grease) refers to a general collection of lipids which are typically found in wastewater and make up a significant portion of problematic wastewater debris. Partially due to its insolubility and density contrasting the aqueous phase, FOG floats on top of the wastewater and accumulates throughout the pipes and holding areas of wastewater treatment process. It is for this reason that there have been major efforts focused on the removal of FOG from wastewater early in the processing, prior to its movement downstream.

Grease, vegetable oil and the like are potentially valuable waste products generated by restaurants, other food preparation establishments, and industrial and/or commercial facilities in which animal and/or vegetable material is processed. However, these lipid-containing waste materials are generally contaminated with high levels of undesirable fatty acids. If these free fatty acids could be economically and efficiently eliminated, while retaining substantially all of the fats in an unaltered state, the fats could be reclaimed for further processing into desirable fuels and/or used in a variety of products.

A problem with reclamation of triglycerides from fatty wastes (i.e., fat-containing waste material from food processing or other industries) is that the fatty waste material typically contains undesirably large amounts of free fatty acids (i.e., fatty acids that are not bonded to another chemical moiety by an ester linkage). Free fatty acids are undesirable for a variety of reasons. The presence of a substantial amount of free fatty acids in reclaimed triglycerides imparts an offensive odor and/or an undesirably yellow or brown color that renders the compositions unsuitable for many applications. Further, reclaimed triglycerides that contain large amounts of free fatty acids cannot be converted to biodiesel fuel using convention techniques employing an alkaline catalyst, and alternative methods involving acid catalysts are too slow to provide practical and economical production of biodiesel fuel.

In many, perhaps most, municipalities, restaurants and other establishments generating a significant quantity of fat-containing lipid waste material are required to intercept or trap such material to prevent it from flowing directly into the sewer. The intercepted or trapped fat-containing waste material is stored in what is commonly referred to as a grease trap. The fat-containing waste material is typically periodically removed from the grease trap for disposal. Bacteria are sometimes added to these systems for intercepting fat-containing waste material in order to decrease the frequency at which material must be removed from the grease trap. The strains typically used for bioaugmentation of materials collected in grease traps produce extra-cellular lipase, which hydrolyzes and breaks the ester bond between the glycerol and fatty acid moieties of triglycerides. The free fatty acids which are produced upon hydrolysis of triglycerides are difficult to degrade, and can cause a pH drop, clogging and malodors, as well as rendering the materials unsuitable for conversion to fuels or other uses.

SUMMARY OF THE DISCLOSURE

Described herein are processes of selectively degrading fatty acids in fat-containing waste materials without significant degradation of triglycerides by contacting the fat-containing waste comprising triglycerides with a bacterial culture comprising *Pseudomonas* bacteria capable of degrading fatty acids, and which are substantially free of microorganisms capable of producing extra-cellular lipase in an amount that would cause significant degradation of the triglycerides.

In accordance with certain embodiments, the triglycerides are separated from the resulting degradation products and the separated triglycerides are reacted with a short chain alcohol in the presence of a catalyst to produce glycerin and alkyl fatty acid esters.

In certain embodiments, the fatty acid content of the treated material is reduced to less than 2% by weight or less than 3% by weight.

In certain embodiments, the fat-containing waste used in the process is a waste cooking oil, and the resulting product is reclaimed cooking oil having a substantially reduced fatty acid content.

In certain embodiments, the reclaimed cooking oil can be used in a new product, such as asphalts, cleaners, coatings, inks, lubricants, animal feeds, cosmetics and adhesive tape.

BRIEF DESCRIPTION OF THE DRAWING

FIG. 1 is a graph showing oxygen consumption in systems comprising a fatty acid carbon source and a bacterial culture comprising *Pseudomonas* bacteria capable of degrading fatty acids and which is substantially free of microorganisms capable of producing extra-cellular lipase in an amount that would cause significant degradation of triglycerides, compared with a similar system that does not contain the bacterial culture.

DESCRIPTION OF ILLUSTRATIVE EMBODIMENTS

The processes described herein are illustrative embodiments that are provided to facilitate understanding and do not limit the scope of this disclosure. Unless otherwise indicated the language of the claims are intended to have the meaning that a person skilled in the art of fatty waste reclamation would normally assign to the language.

The processes described herein use a blend of *Pseudomonas* for treatment of FOG/fatty acid mixtures. In these mixtures, fatty acids are problematic and FOG is a desired product and is wished to be kept. In particular, the greases and oils from FOG are desired and can be used to make other products, such as alternative non-fossil fuels. Restaurants may be able to sell the FOG from their grease traps, if it were not clogged with the undesirable fatty acids. If the fatty acid portion of the FOG mixture could be cleaned of the free fatty acids, the remaining mixture may provide a source of income for restaurants, allowing the reclamation of the desirable portion of the FOG for further processing into desirable fuels and like products. Reclaimed cooking oil can also be used for making a wide variety of products from asphalt, cleaners, coatings, compounds, inks, lubricants, and process oils. Recycled cooking oil can be used in animal feed, cosmetics and adhesive tape. Additionally, these oils can be used in agriculture, construction, dust control, mining, metalworking, personal care, pulp and paper and textiles. In order to facilitate biodiesel production, the free fatty acid content should not exceed 2% or 3% of the feedstock for biodiesel conversion. Waste oil can also be substituted for home heating oil. Unlike conventional bioremediation products, which degrade the FOG portion of the grease, this composition does not degrade the grease itself, only the fatty acid portion of the grease.

As used herein, the term "fat" is intended to refer to triglycerides. A triglyceride is an ester of glycerol and three fatty acids. A fatty acid is a carboxylic acid of general formula RCOOH, in which the R group is aliphatic. Aliphatic groups are non-aromatic groups comprised entirely of carbon and hydrogen. The aliphatic group (R) can be either saturated (i.e., all bonds between carbon atoms are single bonds) or unsaturated (i.e., containing at least one double or triple bond between carbon atoms). Typical fatty acids found in fat-containing waste materials include carboxylic acids having 8 to 26 carbon atoms. Examples of common unsaturated fatty acids include myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid and docosahexaenoic acid. Examples of common saturated fatty acids include caprylic acid, capric acid, lauric acid, myristic acid, palmitic acid, stearic acid, arachidic acid, behenic acid, lignoceric acid and cerotic acid.

Fats can be obtained from animal tissue or from plant material. Grease is a fat-containing material obtained from rendered animal tissue. Vegetable oils are comprised primarily of triglycerides (fats) extracted from plant materials (e.g., seeds, fruits, leaves).

The processes described herein involve contacting fat-containing waste with a blend of *Pseudomonas* that selectively degrade free fatty acids in the fat-containing waste while leaving triglycerides substantially unaffected. In particular, the bacteria cultures used in the processes disclosed herein are substantially free of bacteria and/or other microorganisms that produce an amount of extra-cellular lipase that would cause significant degradation of triglycerides. A significant amount of triglyceride degradation is an amount that would render the process economically unattractive.

Suitable conditions for contact between the fat-containing waste materials (e.g., waste cooking oil) and the bacterial culture are generally ambient conditions that are normally encountered in grease traps and/or other containers or systems in which fats, oils and/or greases (FOGs) are collected. Examples of acceptable temperatures range from about 40° F. (4° C.) to about 110° F. (43° C.). However, temperatures somewhat higher and somewhat lower may provide adequate results. Pressure is not expected to be a significant parameter, and adequate to excellent results are expected over a wide range of pressures. Excellent results are expected over the normal range of ambient pressures, such as from about 12.6 psia (86.5 kPa) to about 15.7 psia (107.9 kPa), although higher or lower pressures are also expected to provide adequate to excellent results. Selective degradation of fatty acids in a mixture of fatty acids and triglycerides by the bacterial culture occurs in the presence of oxygen. A suitable time for contact between the fat-containing waste materials and the bacterial culture is dependent on the desired level of conversion of the fatty acids to the degradation products (carbon dioxide and water) and the conditions during contact, with temperature being a parameter that has a significant influence on the rate of degradation. At about 72° F., adequate conversion to the degradation products can occur in from about 3 days to about 6 days.

It is generally desirable that the process is carried out for sufficient time and under adequate conditions to reduce the amount of fatty acids in a mixture of triglyceride and fatty acids to about 3% by weight or less, or to about 2% by weight or less, thereby providing products suitable for a variety of uses, such as conversion to biodiesel fuel.

A suitable bacterial culture is a liquid bacterial composition formulated with a selected consortium of naturally occurring microbes which were isolated from environments containing elevated levels of recalcitrant organic compounds such as petroleum and aromatic hydrocarbons, and FOG. Concerning FOG removal, these specialized microbes are capable of thoroughly and effectively metabolizing the problematic portion of FOG, the fatty acids. The main constituents of FOG are triglycerides which consist of a glycerol backbone and fatty acid side chains. The bottle neck in FOG removal follows the lipolytic activity, which exclusively cleaves the glycerol backbone leaving glycerol and free fatty acids as by-products. The metabolism of glycerol is ubiquitous and is effortlessly shuttled through glycolysis while lipase producing microbes are relatively abundant. Evidence of this abundance is supported by a USDA study which screened over 1,200 microbial isolates from the ARS Culture Collection in Peoria, Ill. and found that 25% of them produced a lipase (Hou & Johnston, 1992). The burdensome fatty acids persist, continuing to float atop the aqueous phase and adhere to surfaces throughout the wastewater processing, resulting in the aforementioned complications. Addition of the bacterial culture allows for proficient metabolism of fatty acids which is initiated through β-oxidation and completed through the TCA cycle. This bio-catalytic activity greatly assists in removal of these problematic substances. Furthermore, the subsequent alleviation of the fatty acid accumulation allows further lipolysis to occur by widening the bottle neck in FOG breakdown.

Bacterial cultures suitable for use in practicing the disclosed processes can be obtained, for example, by isolating bacterial strains that are effective for degrading fatty acids without producing extra-cellular lipases that would cause degradation of triglycerides, and then optionally cultivating and concentrating these cultures.

Bacterial strains effective for degrading fatty acids without producing unacceptable levels of lipases can be isolated and cultivated from naturally occurring *Pseudomonas* or from *Pseudomonas* that are manipulated, such as by genetic modification by removing plasmids or treatment with mutagenic agents, to inhibit their ability to produce lipases.

An example of a suitable bacterial culture that is capable of selectively degrading fatty acids without significant degradation of triglycerides in a fat-containing waste composition comprising a mixture of fatty acids and triglycerides comprises, for example, *Pseudomonas fluorescens* NRRL-B-18296, *Pseudomonas fluorescens* NRRL-B-18041, *Pseudomonas putida* (e.g., NRRL-B-15172 or NRRL-B-18040) containing plasmid pSRQ50 as carried in *Pseudomonas fluorescens* NRRL-B-18041 and/or *Pseudomonas putida* containing the plasmid pSRQ50 (e.g., NRRL-13-15169, 15170, 15171, 15174 or 15175). These and other suitable *Pseudomonas* strains that may be used are described in U.S. Pat. Nos. 4,870,012; 4,853,334; 4,800,158 and 4,593,003, which are incorporated herein by reference.

Other bacterial cultures that may be used for selectively degrading fatty acids with significant degradation of triglycerides include those isolated, cultivated, modified, or otherwise obtained from *Pseudomonas alcaligenes, Pseudomonas azotifigens, Pseudomonas azotoformans, Pseudomonas chlororaphis, Pseudomonas corrugata, Pseudomonas extremorientalis, Pseudomonas fiavescens, Pseudomonas fluorescens, Pseudomonas fragi, Pseudomonas graminis, Pseudomonas japonica, Pseudomonas marginalis, Pseudomonas migulae, Pseudomonas monteilii, Pseudomonas mosselii, Pseudomonas nitroreducens, Pseudomonas oleovorans, Pseudomonas plecoglossicida, Pseudomonas pseudoalcaligenes, Pseudomonas psychrophila, Pseudomonas putida, Pseudomonas stutzeri, Pseudomonas taiwanensis* and *Pseudomonas veronii*.

The amount of bacterial culture added to the fat-containing waste material can be about $1 \times 10^6$ CFU/ml, although somewhat higher or somewhat lower doses are expected to provide adequate results.

The processes of this invention can be performed at the site at which the fat-containing waste materials are collected (e.g., at a restaurant grease trap, or other food processing facility at which such waste is collected). The treated waste can be periodically sold and removed for various uses including subsequent processing to produce biodiesel fuel. Alternatively, the waste materials can be transported to a central treatment facility for selectively degrading fatty acids, separating triglycerides from the degradation products, and subsequently processing or using the treated materials.

Biodiesel production processes for converting triglycerides into alkyl fatty acid esters of formula ($R^1COOR^2$), where $R^1$ is a low molecular alkyl group, and $R^2$ is an aliphatic hydrocarbon that may be saturated, unsaturated, straight or branched, are well known and may be achieved, for example, by reacting a low molecular weight alcohol (e.g., methanol, ethanol, propanol, n-butanol, etc.) with a triglyceride in the presence of a catalyst to produce glycerin and biodiesel fuel in accordance with the reaction

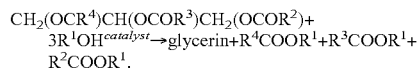

$$CH_2(OCR^4)CH(OCOR^3)CH_2(OCOR^2) + 3R^1OH \xrightarrow{catalyst} glycerin + R^4COOR^1 + R^3COOR^1 + R^2COOR^1.$$

The following examples illustrate that certain *Pseudornonas* strains can be used to selectively degrade fatty acids without degrading triglycerides.

In these examples, sterilized phosphate buffer solution, a Hunters Vitamin free mineral base and an ammonium sulfate solution are prepared. A 1M phosphate buffer (pH 6.8) is prepared by adding 72.13 grams of potassium phosphate monobasic anhydrous ($KH2PO_4$) and 125.99 grams sodium Phosphate dibasic heptahydrate ($NaHPO_4 \cdot 7H_2O$) to 800 ml deionized water and subsequently bringing the volume of the phosphate solution to 1 liter with deionized water.

Hunters Vitamin free mineral base is prepared by combining the ingredients listed in table 1.

TABLE 1

| Hunters Vitamin Free Mineral Base/L of $dH_2O$ | |
|---|---|
| Nitrilotriacetic acid (dissolve by adding 7.4 g KOH) | 10.0 g |
| $MgSO_4 \cdot 7H_2O$ | 14.45 g |
| $CaCl_2 \cdot 2H_2O$ | 3.335 g |
| $(NH_4)_6MO_7O_{24} \cdot 4H_2O$ | 0.00925 g |
| $FeSO_4 \cdot 7H_2O$ | 0.099 g |
| Water | 1 liter |
| Metal "44" | 50 ml |

The metal "44" has the composition listed in Table 2.

TABLE 2

| | |
|---|---|
| $Na_2EDTA$ | 3.184 g |
| $ZnSO_4 \cdot 7H_2O$ | 0.001095 g |
| $FeSO_4 \cdot 7H_2O$ | 5.0 g |
| $MnSO_4 \cdot H_2O$ | 1.54 g |
| $CuSO_4 \cdot 5H_2O$ | 0.392 g |
| $CO(NO_3)_2 \cdot 6H_2O$ | 0.248 g |
| $Na_2B_4O_7 \cdot 10H_2O$ | 0.000177 g |
| $H_2SO_4$ (to retard ppt.) | 4 drops |
| Water | 1 liter |

A 10% ammonium sulfate solution is prepared by adding 100 grams of ammonium sulfate (($NH_4$)$_2SO_4$) to 800 ml of deionized water and subsequently bringing the volume of the phosphate solution to 1 liter with deionized water.

Each of the solutions (phosphate buffer, Hunters Vitamin free mineral base, and ammonium sulfate solution) are sterilized at 121° C. for 15 minutes.

A minimal medium is prepared by combining 4 volume portions of the phosphate buffer solution with 2 volume portions of the vitamin free mineral base and 1 volume portion of the 10% ammonium sulfate solution, and then bringing the total volume to 100 volume portions.

Into amber sample bottles, 95 ml of the minimal median is dispensed. A 1 inch magnetic autoclavable stir bar is added to each sample bottle, along with 50 mg of carbon source (palmitic acid or stearic acid). Each sample bottle is autoclaved for 30 minutes at 15 psi and 121° C. (250° F.), and subsequently cooled to room temperature. Microbial inoculant (100 μl of a bacterial culture comprising a blend of *Pseudomonas* that does not comprise strains that produce significant amounts of extra-cellular lipases and which are capable of degrading fatty acids) is transferred to each bottle. Using a funnel, the contents of one lithium hydroxide powder pillow (Cat. No. 14163-69) is added to each seal cup without allowing the lithium hydroxide particles to contaminate the sample. Each of the samples is connected to a sample tube of a BODTrak instrument for determining and recording biological oxygen demand (BOD) (Hach Company, Loveland, Colo., Cat. No. 26197-00). The BODTrak instrument is placed in an incubator at 30±2° C. and BOD is monitored for 5 days.

The experimental procedures demonstrate the ability of a microbe to utilize a single carbon source through oxygen consumption. The oxygen consumption (mg/L) is proportional to the amount of carbon metabolized and is measured in the closed system by the negative pressure created upon cellular respiration. This method was developed and successfully employed for this purpose at Osprey Biotechnics, Inc., Sarasota, Fla.

The oxygen uptake by the bacterial culture increased throughout the 5 day test and resulted in readings of 854 mg/L and 564 mg/L for Palmitic acid and Stearic acid respectively, compared to all negative controls at −30 mg/L. The significant difference shown in FIG. 1 clearly establishes the ability of the bacterial culture (a blend of *Pseudomonas* that does not comprise strains that produce significant amounts of extracellular lipases) to effectively breakdown fatty acids, such as palmitic acid, the main problematic components of FOG in wastewater.

The described embodiments are preferred and/or illustrated, but are not limiting. Various modifications are considered within the purview and scope of the appended claims.

What is claimed is:

1. A process of selectively degrading fatty acids in fat-containing waste without degradation of triglycerides, comprising:

contacting a fat-containing waste comprising triglycerides and fatty acids with a bacterial culture comprising *Pseudomonas* bacteria capable of degrading fatty acids into water and carbon dioxide, said contacting being done under conditions and for a time sufficient to selectively degrade the fatty acids into water and carbon dioxide, the bacterial culture being substantially free of microorganisms capable of producing extra-cellular lipase that would cause degradation of the triglycerides.

2. A process in accordance with claim 1, in which the fatty acid content of material in the processed waste is less than 3% by weight (mass).

3. A process in accordance with claim 1, in which the fatty acid content of material in the processed waste is less than 2% by weight (mass).

4. A process in accordance with claim 1, in which the fatty acid content of oleophilic material in the processed waste is less than 3% by weight (mass).

5. A process in accordance with claim 1, in which the fatty acid content of oleophilic material in the processed waste is less than 2% by weight (mass).

6. A process in accordance with claim 1, further comprising separating the triglycerides from the degradation products, and reacting the separated triglycerides with a short chain alcohol in the presence of a catalyst to produce glycerine and alkyl fatty acid esters.

7. A process for recycling waste cooking oil, comprising:

providing a waste cooking oil comprising triglycerides and fatty acids, contacting the waste cooking oil with a bacterial culture comprising a *Pseudomonas* bacteria capable of degrading fatty acids in the waste cooking oil into water and carbon dioxide, said contacting being done under conditions and for a time sufficient to selectively degrade the fatty acids into water and carbon dioxide, the bacterial culture being substantially free of microorganisms producing extra-cellular lipase that would cause degradation of triglycerides in the waste cooking oil; and separating the triglycerides from the degradation products to obtain a reclaimed cooking oil.

8. A process in accordance with claim 7, further comprising separating the triglycerides from the degradation products, and reacting the separated triglycerides with a short chain alcohol in the presence of a catalyst to produce glycerine and an alkyl fatty acid ester.

9. A process in accordance with claim 7, in which the reclaimed cooking oil is used in a product selected from asphalts, cleaners, coatings, inks, lubricants, animal feeds, cosmetics and adhesive tape.

* * * * *